(12) United States Patent
Fritsch

(10) Patent No.: US 9,199,593 B2
(45) Date of Patent: Dec. 1, 2015

(54) APPARATUS FOR PROTECTING AUTOMOBILE BUMPERS

(71) Applicant: Remi Fritsch, Paris (FR)

(72) Inventor: Remi Fritsch, Paris (FR)

( * ) Notice: Subject to any disclaimer, the term of this patent is extended or adjusted under 35 U.S.C. 154(b) by 0 days.

(21) Appl. No.: 14/262,775

(22) Filed: Apr. 27, 2014

(65) Prior Publication Data

US 2015/0307046 A1    Oct. 29, 2015

(51) Int. Cl.
| | |
|---|---|
| *B60R 19/44* | (2006.01) |
| *B60R 19/50* | (2006.01) |
| *B60R 13/10* | (2006.01) |
| *B60R 19/48* | (2006.01) |
| *B60R 19/18* | (2006.01) |

(52) U.S. Cl.
CPC .............. *B60R 19/44* (2013.01); *B60R 13/105* (2013.01); *B60R 19/48* (2013.01); *B60R 19/50* (2013.01); *B60R 2019/1886* (2013.01)

(58) Field of Classification Search
CPC ...... B60R 13/105; B60R 19/44; B60R 19/48; B60R 19/50; G09F 2007/1895
See application file for complete search history.

(56) References Cited

U.S. PATENT DOCUMENTS

| | | | | |
|---|---|---|---|---|
| 1,390,732 | A * | 9/1921 | Speicher | 40/209 |
| 2,730,396 | A * | 1/1956 | Johnson | 293/142 |
| 3,379,402 | A * | 4/1968 | Trammell, Jr. | 248/488 |
| 3,900,979 | A * | 8/1975 | Eggenschwiler | 40/209 |
| 4,413,803 | A * | 11/1983 | Ross | 248/475.1 |
| 5,243,503 | A | 9/1993 | Hu | |
| 5,502,912 | A * | 4/1996 | LeBoff et al. | 40/643 |
| 6,394,001 | B1 * | 5/2002 | Giesey et al. | 108/44 |
| 6,874,806 | B1 * | 4/2005 | Blake | 280/507 |
| 8,191,944 | B2 | 6/2012 | Rinklin | |
| 8,531,282 | B1 * | 9/2013 | Santiago | 340/436 |
| 8,764,078 | B1 * | 7/2014 | Lemonides | 293/107 |
| 2005/0210721 | A1 * | 9/2005 | Blackburn | 40/209 |
| 2006/0156595 | A1 * | 7/2006 | Kasak et al. | 40/209 |
| 2006/0191173 | A1 * | 8/2006 | Levine | 40/209 |
| 2008/0054664 | A1 * | 3/2008 | Jones et al. | 296/1.07 |
| 2008/0054677 | A1 * | 3/2008 | McGee | 296/180.1 |
| 2008/0229635 | A1 * | 9/2008 | Soldo | 40/210 |
| 2009/0091145 | A1 * | 4/2009 | Malina et al. | 293/142 |
| 2009/0284030 | A1 * | 11/2009 | Rein | 293/142 |
| 2010/0276951 | A1 * | 11/2010 | Malina et al. | 293/142 |
| 2012/0227294 | A1 * | 9/2012 | Weber | 40/209 |

FOREIGN PATENT DOCUMENTS

| | | | | | |
|---|---|---|---|---|---|
| DE | 102009050949 | A1 * | 5/2011 | | B60R 9/06 |
| DE | 102010036474 | A1 * | 1/2012 | | B60R 19/44 |
| EP | 0885776 | A1 * | 12/1998 | | B60R 3/02 |
| JP | 61196844 | A * | 9/1986 | | B60R 13/04 |
| JP | 03248940 | A * | 11/1991 | | B60R 13/10 |
| KR | 923672 | B1 * | 10/2009 | | B60R 13/10 |

* cited by examiner

*Primary Examiner* — Glenn Dayoan
*Assistant Examiner* — Paul Chenevert
(74) *Attorney, Agent, or Firm* — Law Offices of Michael L. Wise, LLC

(57) ABSTRACT

A bumper protecting apparatus for a vehicle includes a front panel, a rear panel, and a plurality of slidable panels. The front panel comprises a plurality of apparatus license plate mounting holes adapted to support a license plate. The rear panel is coupled to the front panel such that the front panel and the rear panel define a volume therebetween. Lastly, the plurality of slidable panels are adapted to slide into and out of the volume between the front and rear panels. In use, the bumper protecting apparatus may be configured to span the length of an automobile's bumper so as to protect that bumper from collision damage.

11 Claims, 7 Drawing Sheets

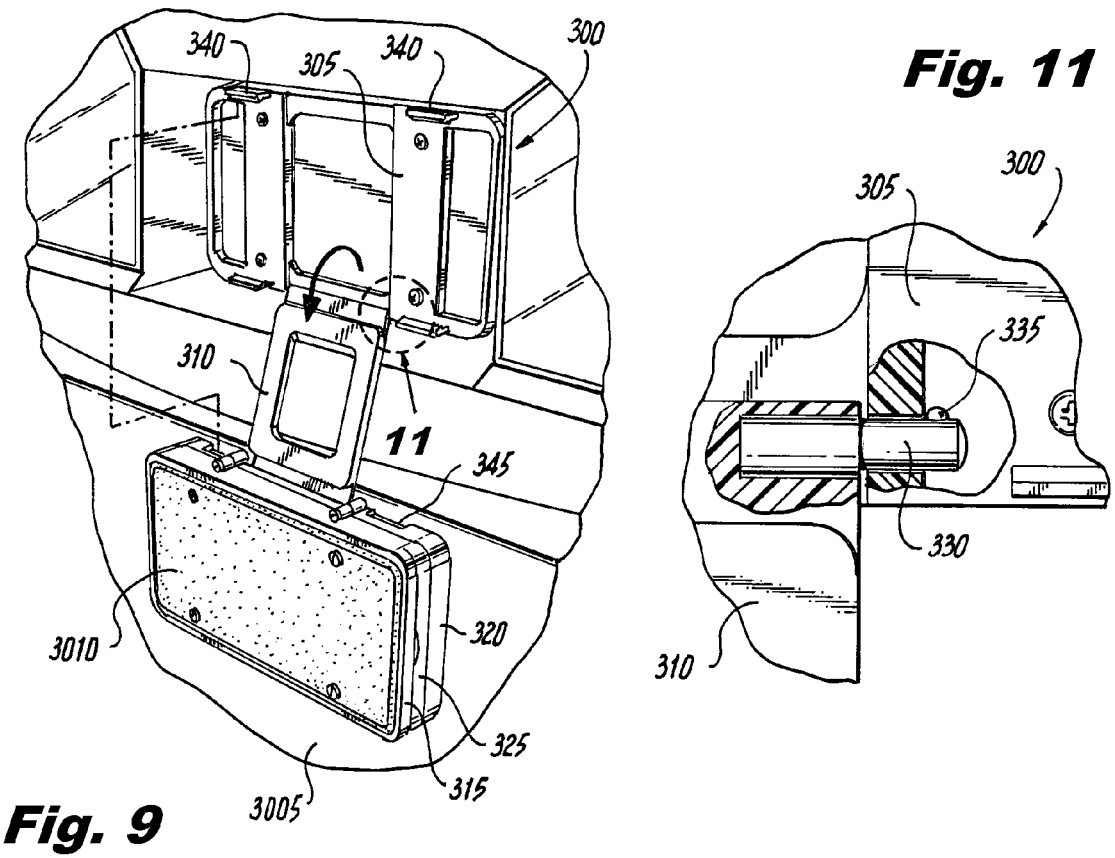
*Fig. 11*
*Fig. 9*
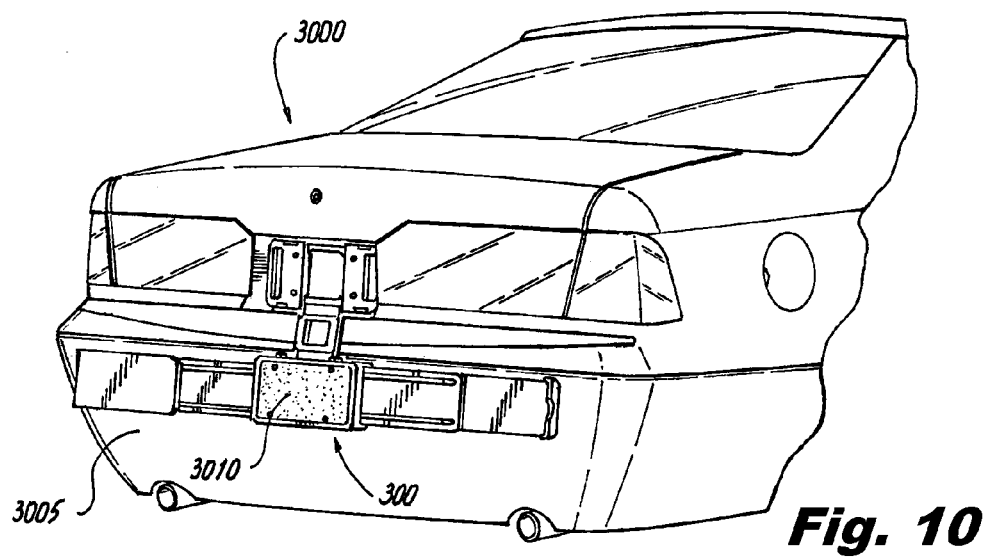
*Fig. 10*

APPARATUS FOR PROTECTING AUTOMOBILE BUMPERS

FIELD OF THE INVENTION

The present invention relates generally to protective coverings adapted for vehicles, and, more particularly, to apparatus for protecting automobile bumpers.

BACKGROUND OF THE INVENTION

A parked car can be easily damaged by drivers attempting to parallel park in front or behind that parked car. Such damage is usually to the bumpers of the parked car, resulting in poor appearance, compromised safety, and expensive repairs. This kind of damage is particularly prevalent in urban environments, where parking is at a premium and drivers often attempt to parallel park their cars in tight spaces with little margin for error.

Several attempts have been made to address the problem of damaged bumpers resulting from parallel parking. These solutions include foam and rubber covers that act to cover some portion of a bumper while a car is parked. A solution marketed as the "BUMPER BADGER," for example, comprises a large rubber panel that can be hung in front of the rear bumper of an automobile utilizing straps that attach inside the vehicle's trunk. Nevertheless, despite some economic success, each of these various solutions suffers from one or more of the following disadvantages: 1) not being universal to several makes and models of automobile; 2) only being capable of protecting the front or the rear bumper of an automobile; 3) being difficult to install; 4) being inconvenient to deploy and store; 5) not being durable; 6) being overly voluminous; and 7) not being particularly aesthetic.

For the foregoing reasons, there is a need for apparatus for protecting automobile bumpers that address these various deficiencies.

SUMMARY OF THE INVENTION

Embodiments of the present invention address the above-identified needs by providing apparatus capable of protecting automobile bumpers. Advantageously, these apparatus are: inconspicuous when not in use, easily stored, easily deployed, usable on most automobiles without modification, durable, relatively easy to manufacture, and easily configured to make an automobile more visible.

Aspects of the invention are directed to an apparatus for protecting a vehicle. The apparatus comprises a front panel, a rear panel, and a plurality of slidable panels. The front panel comprises a plurality of apparatus license plate mounting holes adapted to support a license plate. The rear panel is coupled to the front panel such that the front panel and the rear panel define a volume therebetween. Lastly, the plurality of slidable panels are adapted to slide into and out of the volume between the front and rear panels.

BRIEF DESCRIPTION OF THE DRAWINGS

These and other features, aspects, and advantages of the present invention will become better understood with regard to the following description, appended claims, and accompanying drawings where:

FIG. 9 shows a perspective view of the FIG. 8 apparatus with the apparatus displaced downward;

FIG. 10 shows a perspective view of the FIG. 8 apparatus and automobile with the apparatus in its expanded state;

FIG. 11 shows a partially broken elevational view of a hinge in the FIG. 8 apparatus;

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Figure 1:
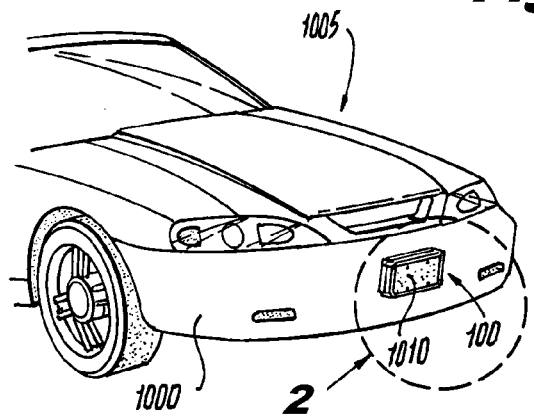
FIG. 1 shows a perspective view of an apparatus in accordance with a first illustrative embodiment of the invention with the apparatus mounted to the front bumper of an automobile and the apparatus in its reduced state.

FIG. 1 shows a perspective view of an apparatus 100 in accordance with a first illustrative embodiment of the invention. In this particular view, the apparatus 100 is mounted to the front bumper 1000 of an automobile 1005 via the automobile's already-existing license plate mounting holes. A license plate 1010 is mounted to the front of the apparatus 100 so that the license plate 1010 remains visible. As will be detailed below, the apparatus 100 can be configured to protect the bumper 1000 from damage that might occur if, for example, the automobile 1005 were parked and another vehicle were to collide with the automobile 1005 from the front.

Figure 2:
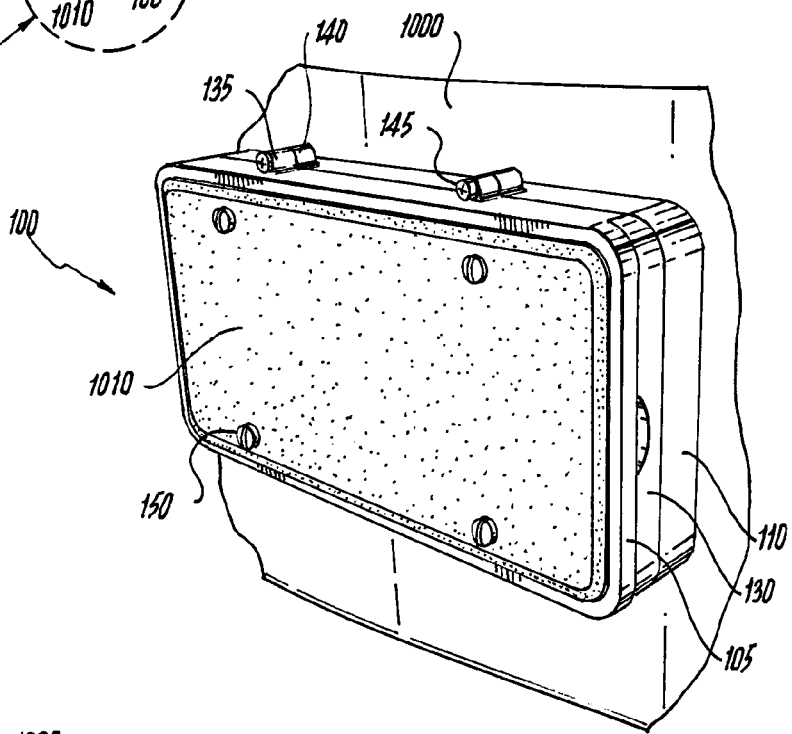
FIG. 2 shows a perspective view of the FIG. 1 apparatus with the apparatus in its reduced state.
Figure 3:
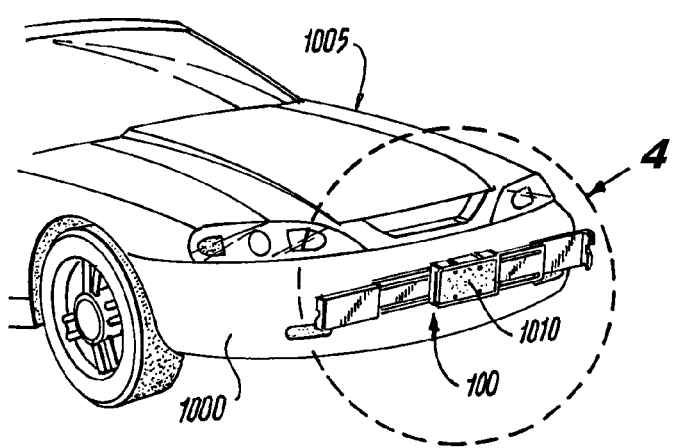
FIG. 3 shows a perspective view of the FIG. 1 apparatus and automobile with the apparatus in its expanded state.
Figure 4:
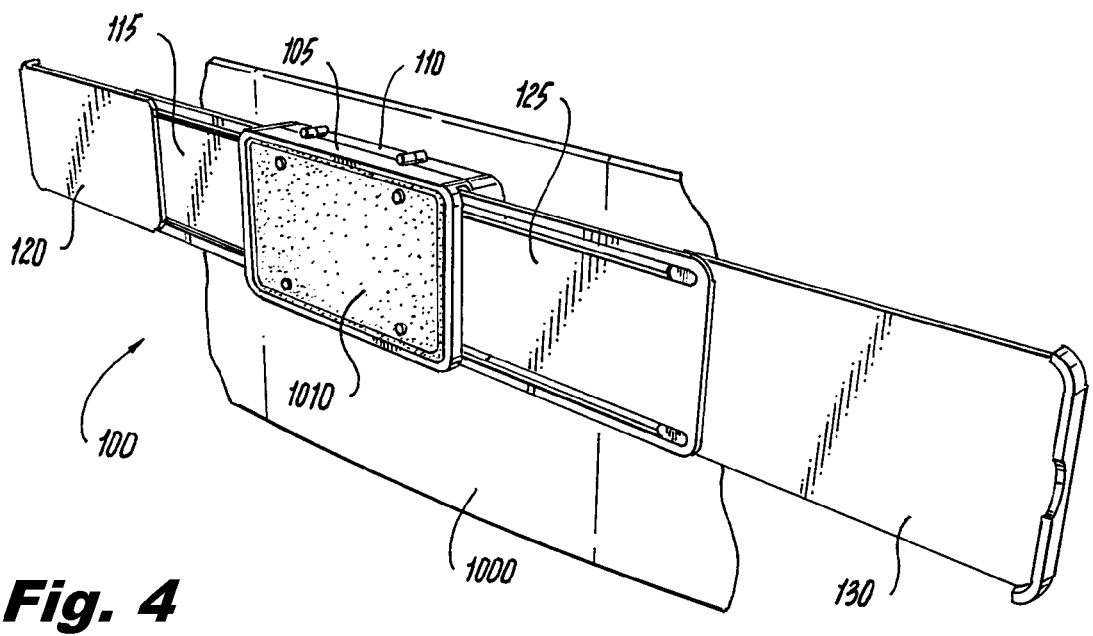
FIG. 4 shows a perspective view of the FIG. 1 apparatus with the apparatus in its expanded state.
Figure 5:
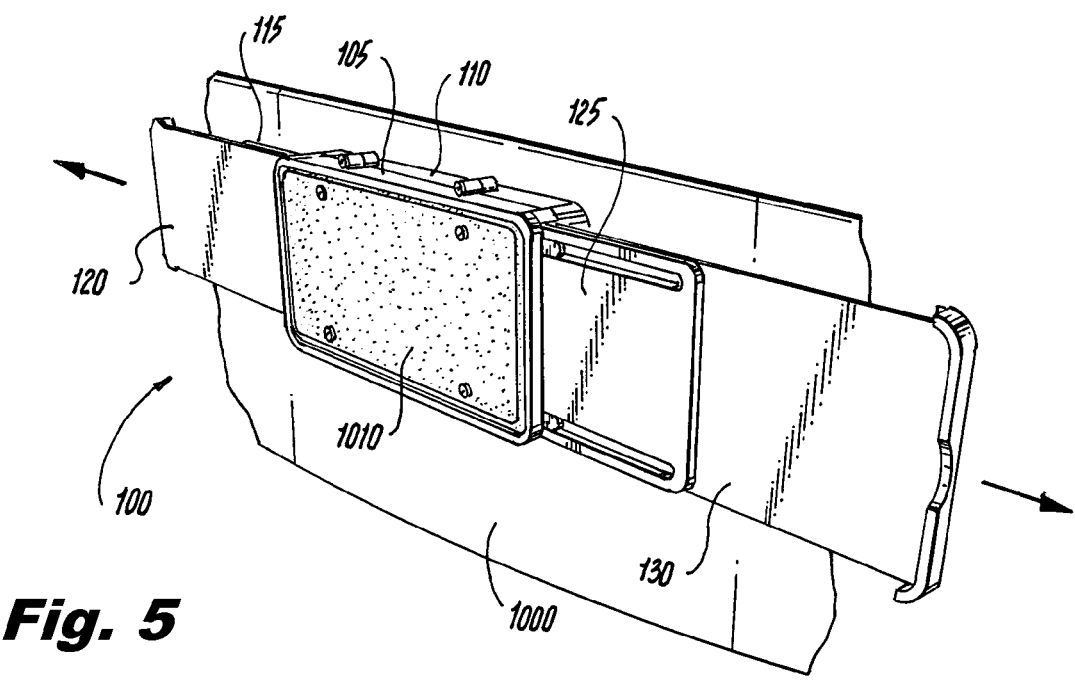
FIG. 5 shows a perspective view of the FIG. 1 apparatus with the apparatus being transitioned from its reduced state to its expanded state.

In accordance with aspects of the invention, the apparatus 100 may take on two states: a reduced state and an expanded state. FIGS. 1 and 2 show perspective views of the apparatus 100 in its reduced state, while FIGS. 3 and 4 show perspective views of the apparatus 100 while in its expanded state. Finally, FIG. 5 shows a perspective view of the apparatus 100 while it is being transitioned from its reduced state to its expanded state.

The apparatus 100 comprises a front panel 105, a rear panel 110, and four slidable panels, namely: a first rear slidable panel 115, a second rear slidable panel 120, a first front slidable panel 125, and a second front slidable panel 130. The front panel 105 and the rear panel 110 are coupled together via four front cylindrical projections 135 and four rear cylindrical projections 140 (FIG. 2). These cylindrical projections 135, 140 are internally threaded and allow four apparatus coupling bolts 145 to fixate the front panel 105 to the rear panel 110. The front panel 105 and the rear panel 110, in turn, define a volume therebetween. The slidable panels 115, 120, 125, 130 are able to slide into and out of this volume utilizing a series of slots and projections (detailed below). The license plate 1010 is attached to the front panel 105 utilizing four license plate mounting bolts 150

In its reduced state (FIGS. 1 and 2), the apparatus 100 forms a compact rectangular box that sits directly behind the license plate 1010 and has about the same length and width as the license plate 1010 (where length is the left-right direction in the figures, and height is the up-down direction). When expanding (FIG. 5), the first rear slidable panel 115 and the second rear slidable panel 120 emerge from the right side of the apparatus 100, while the first front slidable panel 125 and the second front slidable panel 130 emerge from the left side of the apparatus 100 (where left and right are referenced to what a driver of the automobile 1005 would see while looking forward). Finally, in its expanded state (FIGS. 3 and 4), the apparatus 100 is about five times longer than it is in its reduced state. If for example, the reduced apparatus 100 has a length of about 30 centimeters (i.e., the length of a typical U.S. license plate), the expanded apparatus 100 may have a length of about 1.5 meters.

Figure 6:
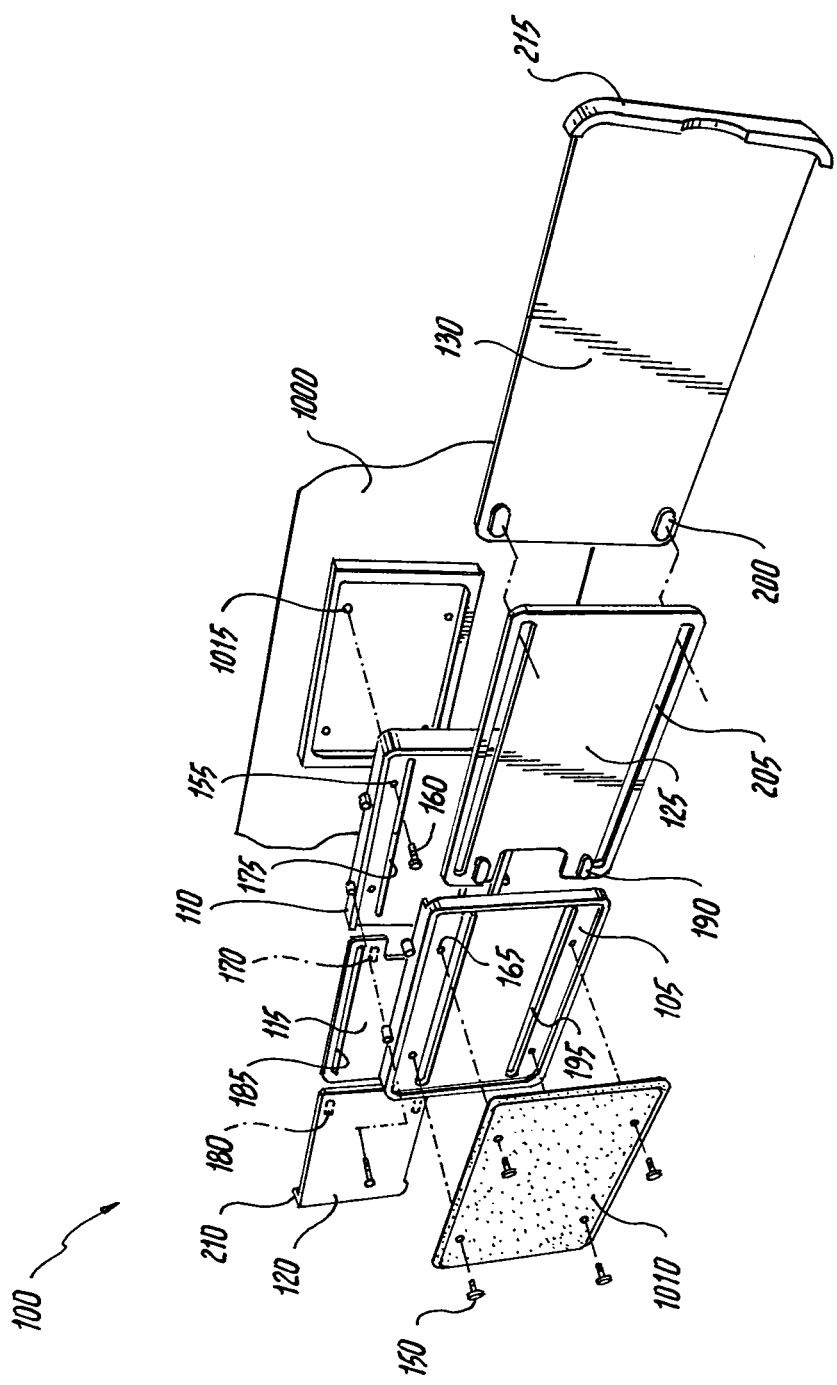
FIG. 6 shows an exploded perspective view of the FIG. 1 apparatus.

Additional details of the apparatus 100 and the manner in which it functions are shown in an exploded perspective view in FIG. 6. In order to mount the apparatus 100 to the automobile 1005, the rear panel 110 defines a set of pass-through holes 155 that are arranged to match a set of automobile license plate mounting holes 1015 already on the automobile 1005. The pass-through holes 155 allow the rear panel 110 to be mounted to the automobile license plate mounting holes 1015 via four apparatus mounting bolts 160. The front panel 105, in turn, comprises a set of apparatus license plate mounting holes 165 adapted to support the license plate 1010. The apparatus license plate mounting holes 165 are preferably internally threaded so that the license plate 1010 can be mounted thereto via the four license plate mounting bolts 150.

The functioning of the slidable panels 115, 120, 125, 130 is achieved in the present non-limiting embodiment by fitting the slidable panels 115, 120, 125, 130 with various slots and projections. More particularly, the first rear slidable panel 115 defines a set of first rear projections 170 that slidably engage a pair of rear slots 175 in the rear panel 110, while the second rear slidable panel 120 defines a pair of second rear projections 180 that engage a pair of first rear slots 185 in the first rear slidable panel 115. At the same time, the first front slidable panel 125 comprises a set of first front projections 190 that slidably engage a pair of front slots 195 in the front panel 105, while the second front slidable panel 130 defines a pair of second front projections 200 that slidably engage a pair of first front slots 205 in the first front slidable panel 125. Configured in this manner, the first rear slidable panel 115 is slidably coupled to the rear panel 110, and the second rear slidable panel 120 is slidably coupled to the first rear slidable panel 115. Likewise, the first front slidable panel 125 is slidably coupled to the front panel 105, and the second front slidable panel 130 is slidably coupled to the first front slidable panel 125.

Referring back to FIGS. 1-6, it will be further noted that the second rear slidable panel 120 defines a second rear sidewall 210 that projects rearward at about 90 degrees from the remainder of the second rear slidable panel 120, while the second front slidable panel 130 contains a similar second front sidewall 215 that projects forward from the remainder of the second front slidable panel 130. Advantageously, these sidewalls 210, 215 allow the apparatus 100 to form a semi-sealed rectangular box when the apparatus 100 is in its reduced state (FIG. 2). More particularly, on the right side of the apparatus 100 in its reduced state, an exposed edge of the front panel 105, an exposed edge of the second rear slidable panel 120 (i.e., the second rear sidewall 210), and an exposed edge of the front panel 105 lie in a single plane without significant gaps between these elements. Likewise, on the left side of the apparatus 100 in its reduced state, an exposed edge of the front panel 105, an exposed edge of the second front slidable panel 130 (i.e., the second front sidewall 215), and an exposed edge of the rear panel 110 lie in a single plane without significant gaps. Sealed in this manner, the reduced apparatus 100 is resistant to the accumulation of dirt and water inside the apparatus 100.

Figure 7:
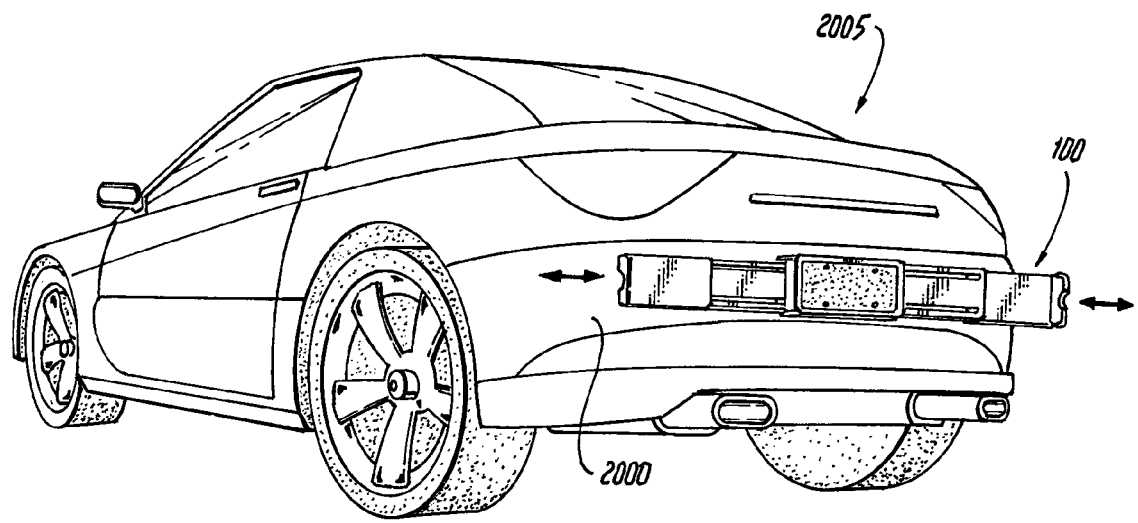
FIG. 7 shows a perspective view of the FIG. 1 apparatus mounted to the rear bumper of an automobile and the apparatus in its expanded state.

While the apparatus 100 is shown on the front bumper 1000 of the automobile 1005 in FIGS. 1-6, it may also be used on the rear bumper of an automobile having license plate mounting holes located on the rear bumper. FIG. 7 shows a perspective view of the apparatus 100 mounted to the rear bumper 2000 of an automobile 2005 having this configuration. Nevertheless, while the automobile 2005 in FIG. 7 has license plate mounting holes on its rear bumper 2000, it is further recognized that most modern automobiles mount the license plate above the rear bumper. Advantageously, alternative embodiments of the invention address this alternate automobile configuration.

Figure 8:
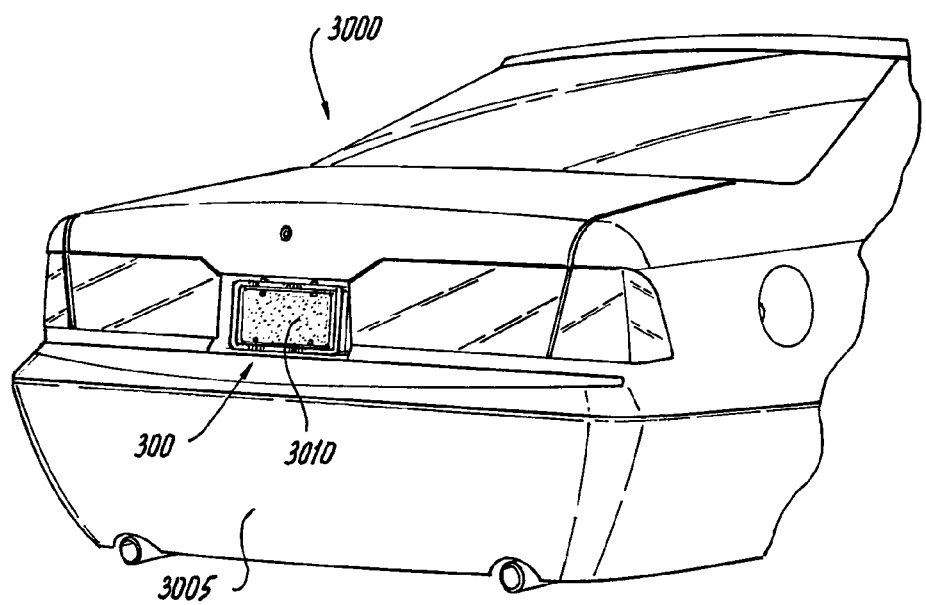
FIG. 8 shows a perspective view of an apparatus in accordance with a second illustrative embodiment of the invention with the apparatus mounted to the back of an automobile and the apparatus in its reduced state.

FIG. 8 shows a perspective view of an apparatus 300 in accordance with a second illustrative embodiment of the invention with the apparatus 300 mounted to an automobile 3000 above the automobile's rear bumper 3005. The apparatus 300 is mounted to the rear of the automobile 1005 via the automobile's already-existing automobile license plate mounting holes. A license plate 3010 is mounted to the front of the apparatus 300.

The apparatus 300 is operative to protect the bumper 3005 below the mounting position of the apparatus 300 through the use of a novel hinged extension mechanism. Aspects of this mechanism and of the remainder of the apparatus 300 are further elucidated in the perspective views in FIGS. 9 and 10. FIG. 9 shows the apparatus 300 still in its reduced state, but lowered so as to be placed over the bumper 3005 of the automobile 3000. FIG. 10 shows a perspective view the lowered apparatus 300 protecting the automobile 3000 with the apparatus 300 in its expanded state.

While the illustrative apparatus 100 set forth above comprises six panels, the present apparatus 300 comprises eight panels in total: a mounting panel 305, a swinging panel 310, a front panel 315, a rear panel 320, and four slidable panels 325. The front panel 315, the rear panel 320, and the slidable panels 325 (collectively the "lowerable set of panels 315, 320, 325") provide similar functionality to the like-named panels in the apparatus 100. That is, the front panel 315 and the rear panel 320 are coupled together so as to define a volume therebetween, which is occupied by the four slidable panels 325. The four slidable panels 325 are operative to slide into and out of the volume via a series of slots and projections. In its reduced state (FIG. 8), the lowerable set of panels 315, 320, 325 thereby appear like a sealed rectangular box. In contrast, when the apparatus 300 is in its expanded state (FIG. 10), the lowerable set of panels 315, 320, 325 expand to cover a large portion of the bumper 3005.

To mount the apparatus 300 to the automobile 3000, the mounting panel 305 includes a plurality of pass-through holes that match up with the automobile's license plate mounting holes. The swinging panel 310, in turn, is hingedly coupled to the mounting panel 305 and to the rear panel 320. Hinged in this manner, the swinging panel 310 allows the lowerable set of panels 315, 320, 325 to be positioned below the mounting panel 305 so that the lowerable set of panels 315, 320, 325 overlap the bumper 3005 of the automobile 3000 (as shown in FIGS. 9 and 10). In this configuration, the swinging panel 310 spans between the mounting panel 305 and the rear panel 320.

The four hinged connections between the swinging panel 310 and the mounting panel 305, and between the swinging panel 310 and the rear panel 320, can be reduced to practice in several ways. FIG. 11 shows a partially broken elevational view of a portion of an illustrative hinge mechanism that couples the swinging panel 310 to the mounting panel 305. A biased plunger-type rod 330 extends from the swinging panel 310 into a socket in the mounting panel 305. Once inserted into the socket in the mounting panel 305, a spring-loaded pin 335 translates upward and traps the rod 330 in this position. The remaining hinged connections may be configured in a similar manner.

Finally, reference again to FIG. 9 will also reveal that the mounting panel 305 comprises four protruding tabs 340, and that the rear panel 320 comprises four complementary recesses 345. These tabs 340 engage the recesses 345 when the lowerable set of panels 315, 320, 325 are raised against the mounting panel 305. Engaged in this manner, the tabs 340 and recesses 354 releasably hold the apparatus 300 in this raised position (i.e., in the position shown in FIG. 8, wherein the rear panel 320 is at the same height as the mounting panel 305 and thereby overlaps the mounting panel 305). The tabs 340 are preferably made of a somewhat flexible plastic. A user wishing to deploy the apparatus 300 from this raised state (i.e., to achieve the configuration in FIG. 10) would, in turn, simply pull forward on the apparatus 300 with sufficient force to cause the flexible tabs 340 on the mounting panel 305 to release from their corresponding recesses 345 on the rear panel 320. The swinging panel 310 would then allow the lowerable set of panels 315, 320, 325 to drop down towards the bumper 3005.

Figure 12:
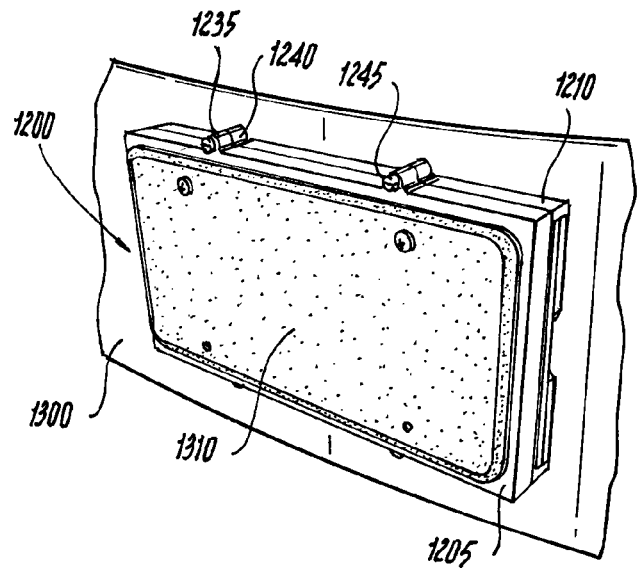
FIG. 12 shows a perspective view of an apparatus in accordance with a third illustrative embodiment of the invention with the apparatus mounted to the front bumper of an automobile and the apparatus in its reduced state.

FIG. 12 shows a perspective view of an apparatus 1200 in accordance with a third illustrative embodiment of the invention. The apparatus 1200 is mounted to the front bumper 1300 of an automobile via the automobile's already-existing license plate mounting holes. A license plate 1310 is mounted to the front of the apparatus 1200.

Figure 13:
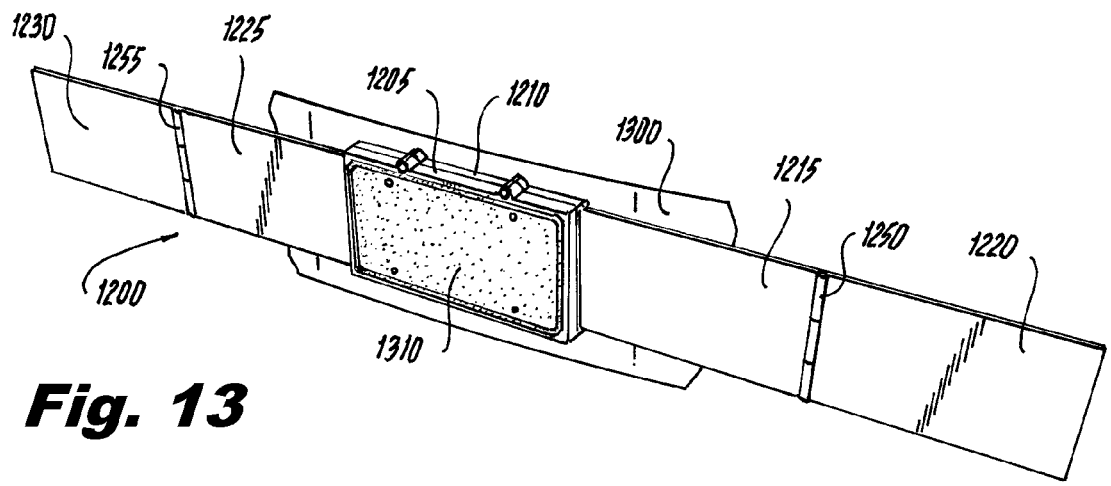
FIG. 13 shows a perspective view of the FIG. 12 apparatus with the apparatus in its expanded state.
Figure 14:
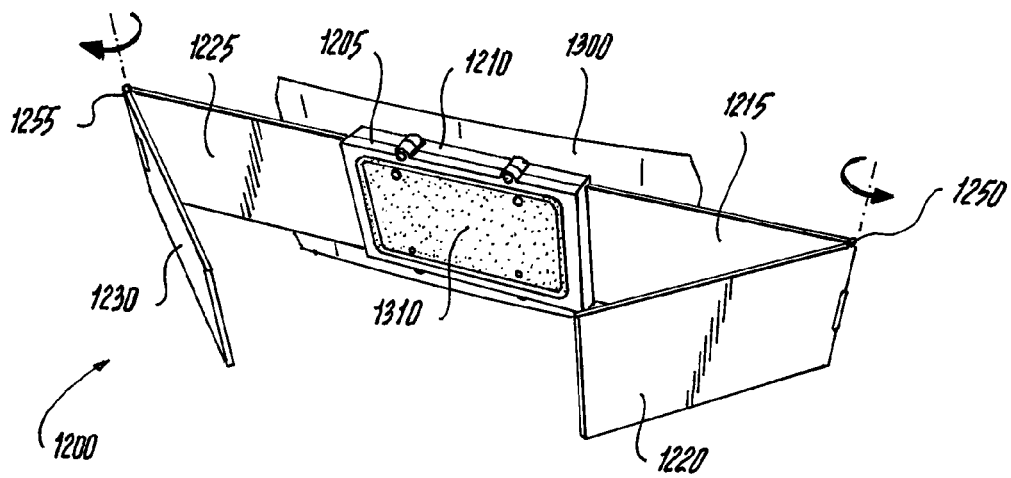
FIG. 14 shows a perspective view of the FIG. 12 apparatus with the apparatus being transitioned from its reduced state to its expanded state.

As was the case with the previously-described apparatus 100, the apparatus 1200 may take on two states: a reduced state and an expanded state. FIG. 12 shows the apparatus 1200 in its reduced state, while FIG. 13 shows a perspective view of the apparatus 1200 while in its expanded state (i.e., the state wherein it is configured to protect the front bumper 1300). FIG. 14 shows a perspective view of the apparatus 1200 while it is being transitioned from its reduced state to its expanded state.

The apparatus 1200 comprises a front panel 1205, a rear panel 1210, and four slidable panels: a first rear slidable panel 1215, a second rear slidable panel 1220, a first front slidable panel 1225, and a second front slidable panel 1230. The front panel 1205 and the rear panel 1210 are coupled together via four front cylindrical projections 1235 and four rear cylindrical projections 1240 that accommodate four apparatus coupling bolts 1245. The front panel 1205 and the rear panel 1210, in turn, define a volume therebetween.

In the apparatus 100, the second rear slidable panel 120 is slidably coupled to the first rear slidable panel 115, while the second front slidable panel 130 is slidably coupled to the first front slidable panel 125. Such is not the case in the apparatus 1200. Instead, in the illustrative apparatus 1200, the second rear slidable panel 1220 is hingedly coupled to the first rear slidable panel 1215 via a rear hinge 1250, while the second front slidable panel 1230 is hingedly coupled to the first front slidable panel 1225 via a front hinge 1255. When the slidable panels 1215, 1220, 1225, 1230 are first slidably removed from the volume between the front panel 1205 and the rear panel 1210, the second rear slidable panel 1220 overlies the first rear slidable panel 1215, and the second front slidable panel 1230 overlies the first front slidable panel 1225. The apparatus 1200 may then be further expanded by rotating the second rear slidable panel 1220 away from the first rear slidable panel 1215 (FIG. 14), and rotating the second front slidable panel 1230 away from the first front slidable panel 1225 (FIG. 14) to achieve the expanded state in FIG. 13. Returning the apparatus 1200 to its reduced state (FIG. 12) simply requires that these rotational motions be reversed and the slidable panels 1215, 1220, 1225, 1230 be slidably returned to the volume between the front panel 1205 and rear panel 1210.

Figure 15:
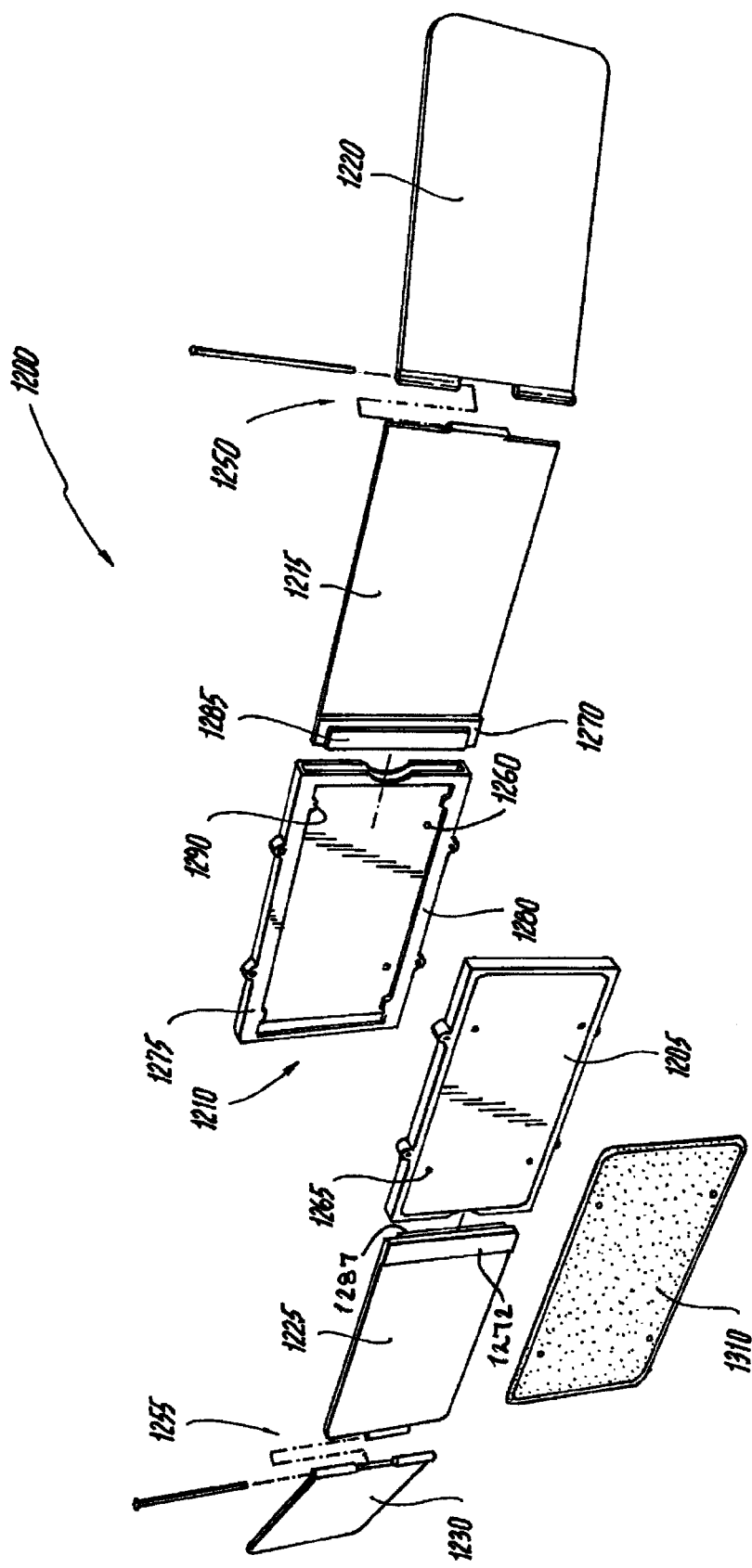
FIG. 15 shows an exploded perspective view of the FIG. 12 apparatus.

Additional details of the apparatus 1200 are shown in an exploded perspective view in FIG. 15. In order to mount the apparatus 1200 to the automobile, the rear panel 1210 defines a set of pass-through holes 1260 that are arranged to match the automobile's license plate mounting holes. At the same time, the front panel 1205 comprises a set of apparatus license plate mounting holes 1265 adapted to support the license plate 1310.

To allow the combination of the first and second rear slidable panels 1215, 1220 to be translated relative to the rear panel 1210, the first rear slidable panel 1215 defines a rear raised edge 1270 having a thickness about equal to the combination of the remainder of the first rear slidable panel 1215 and the second rear slidable panel 1220. At the same time, a rear raised landing 1285 built on top of the rear raised edge 1270 is disposed between an upper rail 1275 and a lower rail 1280 in the rear panel 1210, and is slidably captured thereby. Four tabs 1290 defined by the upper and lower rails 1275, 1280 act to resist, but not limit, the movement of the raised landing 1285 during its transit. The tabs 1290 thereby act to "lock" the first rear slidable panel 1215 in its reduced and expanded states. The first front slidable panel 1225 is similarly slidably captured by the front panel 1205. However, a front raised edge 1272 and a front raised landing 1287 defined by the first front slidable panel 1225 are located on opposed sides of the first front slidable panel 1225 to allow the second front slidable panel 1230 to rotate about the front hinge 1255 relative to the first front slidable panel 1225 in the manner indicated in FIG. 14.

Advantageously, once understood from the teachings set forth herein, the illustrative apparatus 100, 300, 1200 may be manufactured utilizing conventional manufacturing techniques and tooling. If the panels of the apparatus 100, 300, 1200 are formed from plastic (e.g., polyvinyl chloride or polyamide), for instance, those panels can be formed by conventional plastic manufacturing techniques such as, but not limited to, molding, extrusion, and milling processes. These manufacturing techniques and others falling within the scope of the invention will be familiar to one having ordinary skill in the manufacturing arts. Reference is also made to M. P. Groover, *Fundamentals of Modern Manufacturing: Materials, Processes, and Systems*, John Wiley & Sons, 2010, which is hereby incorporated by reference herein. The necessary bolts may be purchased from a multitude of commercial vendors that supply this type of hardware. The bolts preferably comprise metal.

In use, the apparatus 100, 300, 1200 may be placed in their reduced states when an automobile is driven (FIGS. 1, 8 and 12), and then easily converted into their expanded state when the automobile is parked (FIGS. 3, 10, and 13). In their reduced states, the apparatus 100, 300, 1200 are barely visible behind license plates and do not take up a lot of volume. In contrast, in their expanded states, the apparatus 100, 300, 1200 span a majority of the length of the respective bumpers and protect those bumpers from collision damage. Transitioning from the reduced states to the expanded states is as easy as manually sliding a few panels. At the same time, the apparatus 100, 300, 1200, being adapted to mount to already existing license plate mounting holes in an automobile, are usable on most automobiles without modification (i.e., are universal). In any case, if a license plate size dictates a different size for the apparatus 100, 300, 1200, these apparatus may simply be scaled to meet that size with little or no major reconstruction or reengineering. If made from plastic or the like, the apparatus 100, 300, 1200 may be highly durable and relatively easy to manufacture. Optionally, the apparatus 100, 300, 1200 may also be fitted with reflective stickers or painted in a conspicuous color (e.g., school bus yellow) to make an automobile more visible and less likely to be struck by other drivers.

In closing, it should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. An apparatus for protecting a vehicle, the apparatus comprising:
   a front panel, the front panel comprising a plurality of apparatus license plate mounting holes adapted to support a license plate;
   a rear panel, the rear panel coupled to the front panel such that the front panel and the rear panel define a volume therebetween;
   a plurality of slidable panels, each of the plurality of slidable panels adapted to slide into and out of the volume;
   a mounting panel; and
   a swinging panel, the swinging panel hingedly coupled to the mounting panel and to the rear panel.

2. The apparatus of claim 1, wherein the plurality of slidable panels consists of four panels, and two of the four panels are adapted to emerge from a side of the apparatus, and two of the four panels are adapted to emerge from an opposite side of the apparatus.

3. The apparatus of claim 1, wherein:
   the vehicle comprises a plurality of automobile license plate mounting holes; and
   the mounting panel is adapted to be mounted to the vehicle via the plurality of automobile license plate mounting holes.

4. The apparatus of claim 1, wherein the apparatus is configurable such that the swinging panel spans between the mounting panel and the rear panel.

5. The apparatus of claim 1, wherein the mounting panel defines a tab and the rear panel defines a recess, and the apparatus is configurable such that the tab engages the recess so as to releasably hold the rear panel so that the rear panel overlies the mounting panel.

6. The apparatus of claim 1, wherein:
   the vehicle comprises a bumper; and
   the apparatus is configurable to span a majority of a length of the bumper.

7. The apparatus of claim 1, wherein an exposed edge of the rear panel, an exposed edge of the front panel, and an exposed edge of one of the plurality of slidable panels can be arranged to lie in a single plane.

8. An apparatus for protecting a vehicle, the apparatus comprising:
   a front panel, the front panel comprising a plurality of apparatus license plate mounting holes adapted to support a license plate;
   a rear panel, the rear panel coupled to the front panel such that the front panel and the rear panel define a volume therebetween; and
   a plurality of slidable panels, each of the plurality of slidable panels adapted to slide into and out of the volume;
   wherein the plurality of slidable panels comprises:
      a first rear slidable panel;
      a second rear slidable panel;
      a first front slidable panel; and
      a second front slidable panel;
   wherein:
      the first rear slidable panel is slidably coupled to the rear panel; and
      the second rear slidable panel is hingedly coupled to the first rear slidable panel.

9. The apparatus of claim 8, wherein:
   the first front slidable panel is slidably coupled to the front panel; and
   the second front slidable panel is hingedly coupled to the first front slidable panel.

10. The apparatus of claim 8, wherein:
    the rear panel defines a rear upper rail and a rear lower rail; and
    the first rear slidable panel defines a rear raised landing slidably captured by the rear upper rail and the rear lower rail.

11. The apparatus of claim 8, wherein:
    the front panel defines a front upper rail and a front lower rail; and
    the first front slidable panel defines a front raised landing slidably captured by the front upper rail and the front lower rail.

* * * * *